US011431599B2

(12) United States Patent
Raindel

(10) Patent No.: US 11,431,599 B2
(45) Date of Patent: Aug. 30, 2022

(54) NETWORK LATENCY ESTIMATION IN DISTRIBUTED COMPUTING SYSTEMS

(71) Applicant: Microsoft Technology Licensing, LLC, Redmond, WA (US)

(72) Inventor: Shachar Raindel, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/371,338

(22) Filed: Jul. 9, 2021

(65) Prior Publication Data

US 2022/0210039 A1    Jun. 30, 2022

Related U.S. Application Data

(60) Provisional application No. 63/131,116, filed on Dec. 28, 2020.

(51) Int. Cl.
*H04L 43/0864* (2022.01)
*H04L 43/0817* (2022.01)
(Continued)

(52) U.S. Cl.
CPC ...... *H04L 43/0864* (2013.01); *H04L 43/0817* (2013.01); *H04L 43/0894* (2013.01); *H04L 43/10* (2013.01)

(58) Field of Classification Search
CPC ............. H04L 43/0864; H04L 43/0817; H04L 43/0894; H04L 43/10
See application file for complete search history.

(56) References Cited

U.S. PATENT DOCUMENTS 6,438,702 B1 * 8/2002 Hodge ................ H04J 3/0667
713/400
7,206,288 B2    4/2007 Cometto et al.
(Continued)

FOREIGN PATENT DOCUMENTS

JP    2009065579 A *  3/2009 ............ H04J 3/0667

OTHER PUBLICATIONS

Author: Jiemin Liu et al. Title: "MRAPF: Minimum RTT Asymmetric-Path First for Mobile Multi-homed End-to-End Transfer" Year: 2008 Publisher: IEEE (Year: 2008).*
(Continued)

*Primary Examiner* — Uzma Alam
*Assistant Examiner* — Kamal Hossain

(57) ABSTRACT

Techniques for network latency estimation in a computer network are disclosed herein. One example technique includes instructing first and second nodes in the computer network to individually perform traceroute operations along a first round-trip route and a second round-trip route between the first and second nodes. The first round-trip route includes an inbound network path of an existing round-trip route between the first and second nodes and an outbound network path that is a reverse of the inbound network path. The second round-trip route has an outbound network path of the existing round-trip route and an inbound network path that is a reverse of the outbound network path. The example technique further includes upon receiving traceroute information from the additional traceroute operations, determine a latency difference between the inbound and outbound network paths of the existing round-trip route based on the received additional traceroute information.

14 Claims, 8 Drawing Sheets

(51) Int. Cl.
   *H04L 43/0894* (2022.01)
   *H04L 43/10* (2022.01)

(56) References Cited

U.S. PATENT DOCUMENTS

| | | | |
|---|---|---|---|
| 9,344,320 B1* | 5/2016 | Volkman | H04L 69/164 |
| 9,444,722 B2 | 9/2016 | Mosko et al. | |
| 9,787,461 B1 | 10/2017 | Zigelboim et al. | |
| 10,547,500 B1* | 1/2020 | Hardman | H04L 41/065 |
| 10,663,313 B2 | 5/2020 | Sharifi et al. | |
| 2006/0092850 A1* | 5/2006 | Neidhardt | H04L 45/00 |
| | | | 370/252 |
| 2007/0147265 A1 | 6/2007 | Eidson | |
| 2007/0250625 A1 | 10/2007 | Titus | |
| 2008/0159233 A1* | 7/2008 | Achtari | H04W 40/02 |
| | | | 370/332 |
| 2008/0205292 A1 | 8/2008 | Denby et al. | |
| 2008/0225897 A1* | 9/2008 | Bryant | H04J 3/0679 |
| | | | 370/503 |
| 2009/0028062 A1* | 1/2009 | Meloche | H04L 41/12 |
| | | | 370/252 |
| 2009/0147806 A1* | 6/2009 | Brueckheimer | H04J 3/0667 |
| | | | 370/503 |
| 2010/0329125 A1* | 12/2010 | Roberts | H04L 41/12 |
| | | | 370/241.1 |
| 2011/0069714 A1* | 3/2011 | Le Pennec | H04L 45/00 |
| | | | 370/401 |
| 2012/0066360 A1* | 3/2012 | Ghosh | H04L 43/0864 |
| | | | 709/223 |
| 2013/0259049 A1* | 10/2013 | Mizrahi | H04J 3/0664 |
| | | | 370/392 |
| 2013/0272455 A1* | 10/2013 | HomChaudhuri | H04L 27/2647 |
| | | | 375/340 |
| 2017/0317926 A1* | 11/2017 | Penno | H04L 45/64 |
| 2018/0337839 A1* | 11/2018 | Bristow | H04L 41/12 |
| 2020/0145313 A1 | 5/2020 | Raindel et al. | |
| 2021/0400029 A1* | 12/2021 | Wang | H04L 61/6063 |

OTHER PUBLICATIONS

He et al., "On Routing Asymmetry in the Internet", In proceedings of Global Telecommunications Conference, Nov. 28, 2005, pp. 904-909.

Shpiner et al., "Multi-Path Time Protocols", In proceedings of International Symposium on Precision Clock Synchronization for Measurement, Control and Communication (ISPCS), Sep. 22, 2013, 7 Pages.

"International Search Report and Written Opinion Issued in PCT Application No. PCT/US21/058016", dated Feb. 23, 2022, 13 Pages.

* cited by examiner

NETWORK LATENCY ESTIMATION IN DISTRIBUTED COMPUTING SYSTEMS

CROSS-REFERENCE TO RELATED APPLICATION(S)

This application claims priority to U.S. Provisional Application No. 63/131,116, filed on Dec. 28, 2020, the disclosure of which is incorporated herein in its entirety.

BACKGROUND

Distributed computing systems typically include routers, switches, bridges, and other types of network devices that interconnect large numbers of servers, network storage devices, or other computing devices. The individual servers can host one or more virtual machines ("VMs"), containers, virtual switches, or other virtualized functions. The virtual machines or containers can facilitate execution of suitable applications for individual users to provide to the users desired cloud services or other suitable computing services.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Datacenters or other large-scale distributed computing systems can provide computing resources such as virtual machines, containers, or applications as computing services accessible to users via a computer network. The computing services can also communicate with one another via a computer network to exchange data. For instance, a source virtual machine of an online marketplace (e.g., a stock exchange, a currency exchange, a mercantile exchange, an online auction platform, etc.) can execute an application to provide a computing service that monitors online trading/bidding and distributes price data to multiple users subscribing to the information source. As such, the source virtual machine can be configured to transmit price data to various other virtual machines or containers in the distributed computing system via a computer network. The other virtual machines, containers, or applications can then surface the transmitted price data from the information source to users for consumption and action.

Latency estimation can be used to facilitate various aspects of operations in such datacenters or large-scale distributed computing system. For example, clocks running on various virtual machines, containers, or servers may be periodically synchronized to allow coordinated operations with one another. During a clock synchronization process in a datacenter, packets of a synchronization message can be transmitted from a primary node (e.g., a master clock) to a secondary node with a timestamp that is offset by an estimated latency between the primary node and the secondary node.

Typically, a latency offset can be estimated by dividing a round trip time (RTT) between the primary node and the secondary node by two. The RTT is typically measured as follows:

$$RTT = (t4-t1)-(t3-t2)$$

where t1 is a timestamp of a request packet transmission from the primary node; t2 is a timestamp of a request packet reception at the secondary node; t3 is a timestamp of the response packet transmission from the secondary node; and t4 is a timestamp of the response packet reception at the primary node. As such, assuming no clock rate differences (i.e., time counting intervals on both clocks are the same or substantially similar) between the primary and secondary nodes, the clock at the secondary node can be set as follows:

$$t2 = t1 + \frac{RTT}{2}$$

The foregoing clock synchronization technique assumes that a single direction path latency between the primary node and the secondary node is a half of the measured RTT. This assumption, however, may not be accurate under certain scenarios. For example, when the request packet is transmitted from the primary node to the secondary node, the request packet may traverse the computer network along an outbound network path that is different than an inbound network path through which the response packet is transmitted. Thus, the inbound network path may include several network hops that are much more than the outbound network path such that the inbound network latency may be twice as much as the outbound network latency. As such, the assumption of equal inbound and outbound network latency values would cause the clock synchronization between the primary and secondary nodes to be inaccurate.

Several embodiments of the disclosed technology can address several aspects of the foregoing difficulties by implementing a traceroute technique to assign a single path network latency to a network path in a computer network in a datacenter or other suitable types of distributed computing system. In certain implementations, when measuring an RTT between a primary node and a secondary node, a latency controller can be configured to cause the primary and secondary nodes to trace specific connections of the network paths between the primary and secondary nodes that corresponds to the measured RTT. In one example, the latency controller can be configured to cause transmission of a traceroute packet between the primary and secondary nodes by, for instance, executing a traceroute command on the primary and/or secondary nodes. The traceroute command can be implemented to identify and store inbound and outbound network paths of the round-trip route between the primary and secondary nodes. The inbound and outbound paths can be identified by one or more network identifiers (e.g., IP addresses, MAC addresses, etc.) of network devices (e.g., switches, routers, etc.) in an underlay network between the primary and secondary nodes. In other implementations, the primary and second nodes can be programmed to perform the traceroute operations automatically, periodically, or in other suitable manners. In other examples, the latency controller can be configured to cause the primary and second nodes to perform traceroute-like operations without executing an external command, such as the traceroute command.

In certain embodiments, the individual primary and/or secondary nodes can be a virtual machine, a container, or other suitable types of virtualized component on a server or other suitable types of a host. To facilitate a traceroute operation, the host can be configured to expose such a functionality to the virtualized component via a software component in an operating system, a hypervisor, or in a network device driver. For example, a hypervisor can be configured to provide an application programming interface (API) that allows a virtual machine or container to request a traceroute operation as described below. In other examples, an operation system can provide such a functionality as a part of a virtualized network interface card (NIC) to a virtual machine or container.

In general, a traceroute command is an example of a network diagnostic function that can be used to identify a network path that a packet traverses from a source to a destination in a computer network. The traceroute function can be used to list intermediate network devices or "hops" between, for example, a source (e.g., the primary node) and a destination (e.g., the secondary node) that the packet passes through until either the packet reaches the destination or fails to reach the destination and is discarded at an intermediate network device.

The traceroute function typically operates by causing each network device along a network path to return a message, such as an Internet Control Message Protocol (ICMP) message to a source (e.g., the primary node) that invoked the traceroute function. A packet typically contains a time-to-live (TTL) value which specifies how many hops that the packet can traverse in a computer network before the packet expires. Each time a packet passes through a network device, the TTL value of the packet is decremented by a preset amount (e.g., one). When the TTL value of the packet expires (e.g., the TLL value reaches zero) at an intermediate network device, the network device discards the packet and transmit a "TTL Exceeded" message to the source that invokes the traceroute function.

The traceroute function typically operates over Internet Protocol (IP) networks using IP datagrams. In some embodiments, the source may use the traceroute function to send a series of ICMP Echo Request packet with different TTL values to identify intermediate network devices. For example, the source may invoke the traceroute function to initially send a first packet from the source with a TTL value of one to a destination. The first network device along the network path decrements the TTL of the first packet to zero and discards the first packet because the TTL has expired. The first network device then returns a "TTL Exceeded" message to the source. Based on the returned "TTL Exceeded" message, the source can identify that the first network device as a first hop on the network path to the destination. The source can then send a second packet with a TTL value of two to the destination. Upon receiving the second packet, the first network device along the network path decrements the TTL of the second packet to one and forwards the second packet to a second network device in the network path. Upon receiving the second packet, the second network device along the network path decrements the TTL of the second packet to zero and discards the second packet because the TTL has expired. The second network device then returns a "TTL Exceeded" message to the source. Based on the returned "TTL Exceeded" message from the second network device, the source can identify the second network device as the second hop on the network path from the source to the destination.

The source can then send additional packets with a TTL of three, four, five, and so on to the destination, causing each subsequent network devices along the network path to return a "TTL Exceeded" message. Thus, based on the "TTL Exceeded" messages from the subsequent network devices, the source can discover intermediate hops in the network path (referred to as "outbound network path) until either the destination is reached or the maximum TTL value is reached and the traceroute operation ends. The destination can also invoke the same traceroute function to discover intermediate network devices from the destination to the source (referred to as "inbound network path). As discussed in more detail below, packets with the same or substantially similar 5-tuple (e.g., a source IP address, a destination IP address, a source port, a destination port, and a transport protocol) may be used to traverse the same intermediate network devices or connections as an original flow of packets along a network path. The source and destination can then report to the latency controller a network route having both the inbound and outbound network paths between the source and destination.

Upon obtaining traceroute data of the network route, the latency controller can be configured to determine whether the inbound and outbound network paths are generally or approximately symmetrical. As used herein, the term "symmetrical network paths" generally refers to network paths with identical intermediate network devices arranged in identical sequences relative to each other. As such, an inbound packet would traverse the computer network along the same network devices as an outbound packet in the reverse direction. In response to determining that the inbound and outbound network paths are symmetrical, the latency controller can be configured to indicate accordingly and set the latency offset to be one half of a measured RTT between the source and destination (e.g., the primary and secondary nodes).

On the other hand, in response to determining that the inbound and outbound network paths are asymmetrical, the latency controller can be configured to indicate that the assumption of equal inbound and outbound latency is inaccurate. In certain implementations, the latency controller can also be configured to cause the primary and secondary nodes to perform traceroute operations and RTT measurements for a pair of symmetrical round-trip routes constructed based on the inbound and outbound network paths of the asymmetrical network paths. For example, a first symmetrical round-trip route can be constructed using the outbound network path and a new inbound network path that is the reverse of the outbound network path. A second symmetrical round-trip route can be constructed using the inbound network path and a new outbound network path that is the reverse of the inbound network path.

Packets can be directed to follow the two constructed symmetrical round-trip routes by manipulating 5-tuples via source routing according to which a source specifies a network route a packet takes through a computer network (or via other suitable means) while RTTs are measured. By comparing the measured RTTs of the two symmetrical round-trip routes, the latency controller can be configured to deduct a latency difference (θ) between the inbound network path and the outbound network path of the original network route between the source and the destination as follows:

$$\theta = \frac{RTT1 - RTT2}{2}$$

where RTT1 is the RTT of the first symmetrical round-trip route while RTT2 is the RTT of the second symmetrical round-trip route. Having the latency difference (θ) between the asymmetrical inbound and outbound network paths, in certain embodiments, the latency controller can then adjust the latency offset for a clock synchronization packet as follows:

$$t2 = t1 + \frac{RTT}{2} + \theta$$

where RTT is the round-trip time between the primary and secondary nodes; t1 is the clock time at the primary node; and t2 is the clock time on the secondary node. In other embodiments, the latency controller can be configured to indicate that by varying 5-tuple, one or more symmetrical network paths are available in the computer network between the primary and secondary nodes. The latency controller can then leverage the discovered symmetrical network routes for latency estimation with additional measured RTTs using the varied 5-tuple.

In other implementations, instead of constructing and directing packets to follow the two constructed first and second symmetrical round-trip routes, the latency controller can be configured to continue monitoring traceroute data from the primary, secondary, or other nodes in the computer network for network routes (or partial routes) that at least approximately match (e.g., >90%, >95%, >99%, 100%, or other suitable thresholds) the first and second symmetrical round-trip routes. Such traceroute data can then be used to estimate latency difference between the asymmetrical inbound and outbound network paths, as described above. In further implementations, traceroute data of only one of the first or second symmetrical round-trip routes may be used to estimate the latency difference by subtracting the RTT of the first or second symmetrical round-trip routes from the RTT of the asymmetric round-trip route between the primary and secondary nodes, or vice versa.

Several embodiments of the disclosed technology can thus accommodate differences between the inbound and outbound network paths of a round-trip route between a primary and a secondary node. By constructing and measuring RTTs of the two new round-trip routes using the asymmetrical inbound and outbound network paths, the latency difference between the inbound and outbound network paths of the original asymmetrical round-trip route can be estimated or measured. As such, latency estimation between inbound and outbound network traffic between the primary and secondary nodes can be more accurate than assuming that the latency is the same for both the inbound and outbound network traffic.

Several embodiments of the disclosed technology can be useful in determining a latency of a link between a pair of network devices in the computer network using a dataset from large numbers of network devices. For instance, a traceroute result of a symmetrical path and a corresponding RTT can be one projection of latency in the computer network. By obtaining many such projections, a per link latency may be determined using Tomographic reconstruction or other suitable techniques.

Additional embodiments of the disclosed technology are also directed to exposing an operating temperature and/or an environmental temperature of one or more hosts hosting the primary and secondary nodes to the latency controller. Without being bound by theory, it is believed that timing (e.g., a clock offset, a timing interval, etc.) of digital clocks in computer servers can be influenced by temperature changes at the computer servers. Correlations between timing of a clock on a host and an operating/environmental temperature can be developed using historical measurements or via other suitable methods. As such, using such correlations, the latency controller (or other suitable components in the computing system) can empirically or otherwise determine one or more clock correction factors (e.g., offset, frequency, timing, etc.) based on a current temperature of the computer server hosting the primary and secondary nodes and/or one or more components thereof. Thus, accuracy of clock synchronization can be further improved.

The information needed for such clock correction might be acquired using a specialized API call to the primary and/or secondary nodes and other nodes in the distributed computing system, like the operations described above. The latency controller can also be configured to determine the temperature of one or more components (e.g., a CPU) on a node to further improve estimate of the drift a clock source is experiencing due to thermal factors.

DETAILED DESCRIPTION

Figure 1:
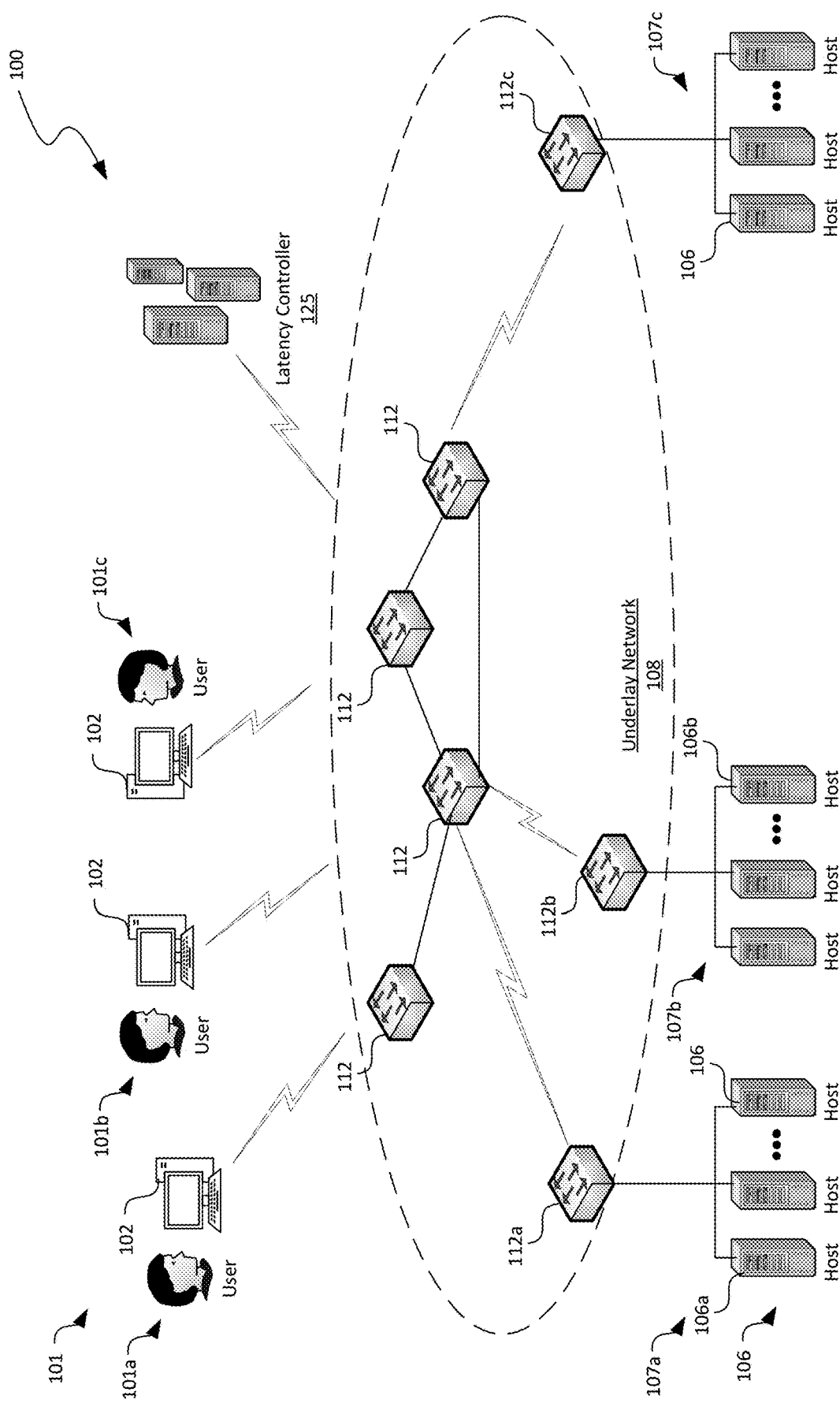
FIG. 1 is a schematic diagram illustrating a distributed computing system implementing network latency estimation in accordance with embodiments of the disclosed technology.

Certain embodiments of systems, devices, components, modules, routines, data structures, and processes for network latency estimation in datacenters or other suitable distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-6.

As used herein, the term "distributed computing system" generally refers to an interconnected computer system having multiple network nodes that interconnect a plurality of servers or hosts to one another and/or to external networks (e.g., the Internet). The term "network node" generally refers to a physical network device. Example network nodes include routers, switches, hubs, bridges, load balancers, security gateways, or firewalls. A "host" generally refers to a physical computing device. In certain embodiments, a host can be configured to implement, for instance, one or more virtual machines, virtual switches, or other suitable virtualized components. For example, a host can include a server having a hypervisor configured to support one or more virtual machines, virtual switches, or other suitable types of virtual components. In other embodiments, a host can be configured to execute suitable applications directly on top of an operating system.

A computer network can be conceptually divided into an overlay network implemented over an underlay network in certain implementations. An "overlay network" generally refers to an abstracted network implemented over and operating on top of an underlay network. The underlay network can include multiple physical network devices interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can host one or more tenant end points ("TEPs"), for example, virtual machines. The virtual networks can interconnect multiple TEPs on different hosts.

Virtual network nodes in the overlay network can be connected to one another by virtual links individually corresponding to one or more network routes along one or more physical network devices in the underlay network. In other implementations, a computer network can only include the underlay network. As used herein, a "network route" or "network path" generally refers to a sequence of one or more network nodes a packet traverses from a source (e.g., a first host) to reach a destination (e.g., a second host). A "round-trip" network route generally refers to a pair of inbound and outbound network paths between a source and a destination. In some examples, the inbound and outbound network paths can be symmetrical, e.g., having the same sequence of intermediate network nodes in reverse directions. In other examples, the inbound and outbound network paths can be asymmetrical, e.g., having different sequences and/or intermediate network nodes in reverse directions.

As used herein, a "packet" generally refers to a formatted unit of data carried by a packet-switched network. A packet typically can include user data along with control data. The control data can provide information for delivering the user data. For example, the control data can include source and destination network addresses/ports, error checking codes, sequencing information, hop counts, priority information, security information, or other suitable information regarding the user data. Typically, the control data can be contained in headers and/or trailers of a packet. The headers and trailers can include one or more data field containing suitable information.

FIG. 1 is a schematic diagram illustrating a distributed computing system 100 implementing network latency estimation in accordance with embodiments of the disclosed technology. As shown in FIG. 1, the distributed computing system 100 can include an underlay network 108 interconnecting a plurality of hosts 106, a plurality of client devices 102 associated with corresponding users 101, and a latency controller 125 operatively coupled to one another. Even though particular components of the distributed computing system 100 are shown in FIG. 1, in other embodiments, the distributed computing system 100 can also include additional and/or different components or arrangements. For example, in certain embodiments, the distributed computing system 100 can also include network storage devices, servers, and/or other suitable components in suitable configurations.

As shown in FIG. 1, the underlay network 108 can include one or more network nodes 112 that interconnect the multiple hosts 106 and the client device 102 of the users 101. In certain embodiments, the hosts 106 can be organized into racks, action zones, groups, sets, or other suitable divisions. For example, in the illustrated embodiment, the hosts 106 are grouped into three clusters identified individually as first, second, and third clusters 107a-107c. The individual clusters 107a-107c are operatively coupled to a corresponding network nodes 112a-112c, respectively, which are commonly referred to as "top-of-rack" network nodes or "TORs." The TORs 112a-112c can then be operatively coupled to additional network nodes 112 to form a computer network in a hierarchical, flat, mesh, or other suitable types of topology. The underlay network can allow communications among hosts 106, the latency controller 125, and the client devices 102 of the users 101. In other embodiments, the multiple clusters 107a-107c may share a single network node 112 or can have other suitable arrangements.

The hosts 106 can individually be configured to provide computing, storage, and/or other cloud or other suitable types of computing services to the users 101. For example, as described in more detail below with reference to FIG. 2, one of the hosts 106 can initiate and maintain one or more virtual machines 144 (shown in FIG. 2) or containers (not shown) upon requests from the users 101. The users 101 can then utilize the provided virtual machines 144 or containers to perform database, computation, communications, and/or other suitable tasks. In certain embodiments, one of the hosts 106 can provide virtual machines 144 for multiple users 101. For example, the host 106a can host three virtual machines 144 individually corresponding to each of the users 101a-101c. In other embodiments, multiple hosts 106 can host virtual machines 144 for the users 101a-101c.

The client devices 102 can each include a computing device that facilitates the users 101 to access computing services provided by the hosts 106 via the underlay network 108. In the illustrated embodiment, the client devices 102 individually include a desktop computer. In other embodiments, the client devices 102 can also include laptop computers, tablet computers, smartphones, or other suitable computing devices. Though three users 101a-101c are shown in FIG. 1 for illustration purposes, in other embodiments, the distributed computing system 100 can facilitate any suitable numbers of users 101 to access cloud or other suitable types of computing services provided by the distributed computing system 100.

The latency controller 125 can be configured to manage and control network latency estimation between endpoints (e.g., virtual machines) in the distributed computing system 100. For example, the latency controller 125 can be configured to cause various endpoints in the distributed computing system 100 to perform traceroute operations and identify network paths having one or more network nodes 112 that a packet traverses in the underlay network 100. The latency controller 125 can also be configured to determine whether the performed traceroute operations indicate that a round-trip route between a pair of endpoints includes symmetrical inbound and outbound network paths or asymmetrical inbound and outbound network paths. In response to determine that the round-trip route include asymmetrical inbound and outbound network paths, the latency controller 125 can also be configured to construct a pair of new symmetrical round-trip routes using each of the inbound and outbound network paths from the asymmetrical inbound and outbound network paths. By measuring the RTTs of the constructed symmetrical round-trip routes, the latency controller can be configured to determine a latency difference between the inbound and outbound network paths. The latency controller can then adjust the latency offset between the pair of endpoints accordingly to improve accordance of clock synchronization in the distributed computing system 100, as described in more detail below with reference to FIGS. 3A-5B.

Though the latency controller 125 is shown in FIG. 1 as one entity, in certain implementations, the latency controller 125 can be implemented in a distributed manner. For instance, one or more parts of logic of the latency controller 125 can be distributedly executed on one or more of the hosts 106. For example, the individual hosts 106 can include certain instructions execution of which cause a first host 106a to independently traceroute a network path to a second host 106b. The first host 106a can then report the discovered network path to the second host 106b. The first and second hosts 106a and 106b can separately determine if the discovered path is symmetric or not and adjust latency estimation accordingly.

Figure 2:
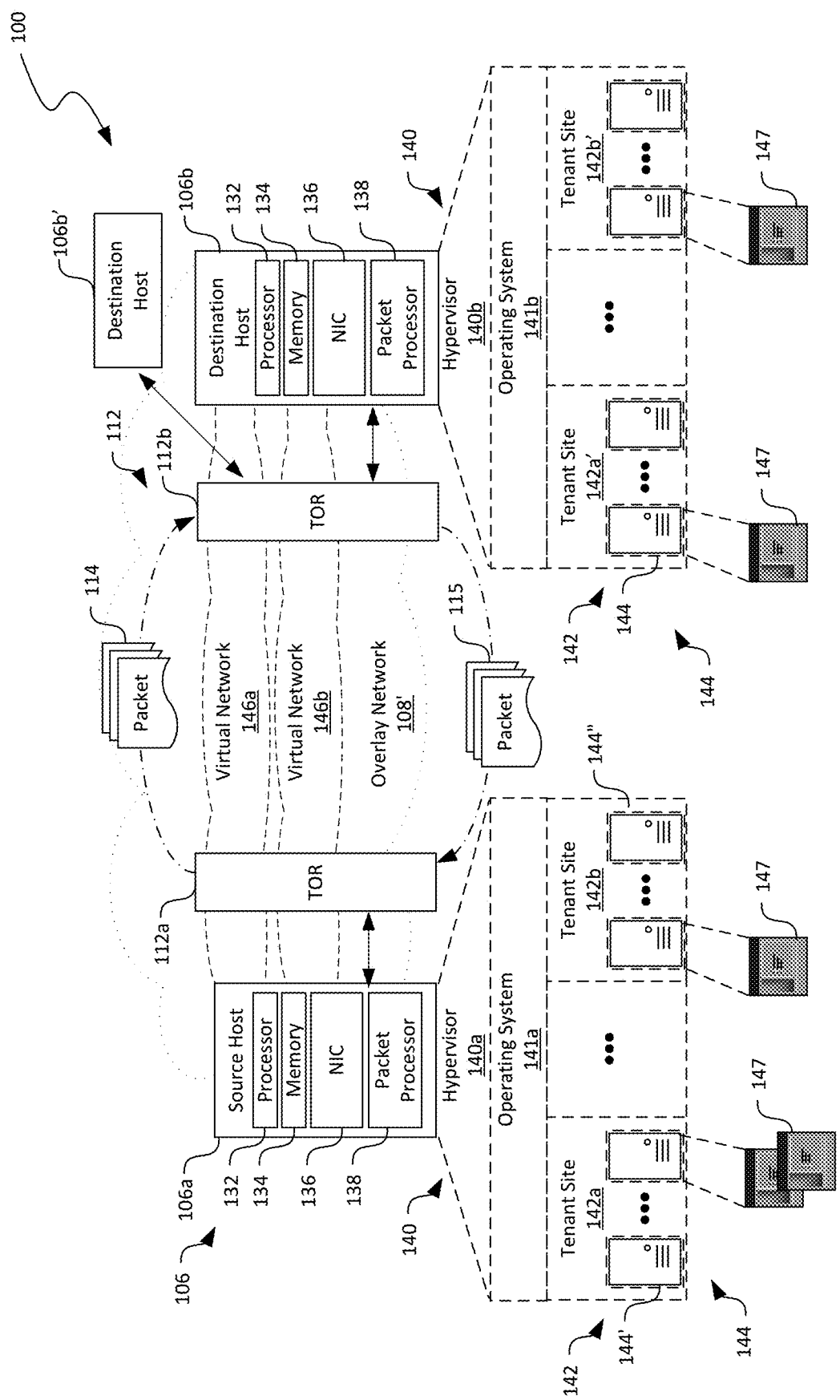
FIG. 2 is a schematic diagram illustrating certain hardware/software components of the distributed computing system of FIG. 1 in accordance with embodiments of the disclosed technology.

FIG. 2 is a schematic diagram illustrating certain hardware/software components of the distributed computing system 100 in accordance with embodiments of the disclosed technology. FIG. 2 illustrates an overlay network 108' that can be implemented on the underlay network 108 in FIG. 1. Though particular configuration of the overlay network 108' is shown in FIG. 2, In other embodiments, the overlay network 108' can also be configured in other suitable ways. In FIG. 2, only certain components of the underlay network 108 of FIG. 1 are shown for clarity.

In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the source host 106a and the destination hosts 106b and 106b' (only the destination hosts 106b is shown with detail components) can each include a processor 132, a memory 134, a network interface card 136, and a packet processor 138 operatively coupled to one another. In other embodiments, the hosts 106 can also include input/output devices configured to accept input from and provide output to an operator and/or an automated software controller (not shown), or other suitable types of hardware components.

The processor 132 can include a microprocessor, caches, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 3A-5B). Though only one processor 132 and one memory 134 are shown in the individual hosts 106 for illustration in FIG. 2, in other embodiments, the individual hosts 106 can include two, six, eight, or any other suitable number of processors 132 and/or memories 134.

The source host 106a and the destination host 106b can individually contain instructions in the memory 134 executable by the processors 132 to cause the individual processors 132 to provide a hypervisor 140 (identified individually as first and second hypervisors 140a and 140b) and an operating system 141 (identified individually as first and second operating systems 141a and 141b). Even though the hypervisor 140 and the operating system 141 are shown as separate components, in other embodiments, the hypervisor 140 can operate on top of the operating system 141 executing on the hosts 106 or a firmware component of the hosts 106.

The hypervisors 140 can individually be configured to generate, monitor, terminate, and/or otherwise manage one or more virtual machines 144 organized into tenant sites 142. For example, as shown in FIG. 2, the source host 106a can provide a first hypervisor 140a that manages first and second tenant sites 142a and 142b, respectively. The destination host 106b can provide a second hypervisor 140b that manages first and second tenant sites 142a' and 142b', respectively. The hypervisors 140 are individually shown in FIG. 2 as a software component. However, in other embodiments, the hypervisors 140 can be firmware and/or hardware components. The tenant sites 142 can each include multiple virtual machines 144 for a particular tenant (not shown). For example, the source host 106a and the destination host 106b can both host the tenant site 142a and 142a' for a first tenant 101a (FIG. 1). The source host 106a and the destination host 106b can both host the tenant site 142b and 142b' for a second tenant 101b (FIG. 1). Each virtual machine 144 can be executing a corresponding operating system, middleware, and/or applications.

Also shown in FIG. 2, the distributed computing system 100 can include an overlay network 108' having one or more virtual networks 146 that interconnect the tenant sites 142a and 142b across multiple hosts 106. For example, a first virtual network 142a interconnects the first tenant sites 142a and 142a' at the source host 106a and the destination host 106b. A second virtual network 146b interconnects the second tenant sites 142b and 142b' at the source host 106a and the destination host 106b. Even though a single virtual network 146 is shown as corresponding to one tenant site 142, in other embodiments, multiple virtual networks 146 (not shown) may be configured to correspond to a single tenant site 146.

The virtual machines 144 can be configured to execute one or more applications 147 to provide suitable cloud or other suitable types of computing services to the users 101 (FIG. 1). For example, the source host 106a can execute an application 147 that is configured to provide a computing service that monitors online trading and distribute price data to multiple users 101 subscribing to the computing service. The virtual machines 144 on the virtual networks 146 can also communicate with one another via the underlay network 108 (FIG. 1) even though the virtual machines 144 are located on different hosts 106.

Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machines 144 in a particular virtual network 146. Thus, different virtual networks 146 can use one or more virtual network addresses that are the same. Example virtual network addresses can include IP addresses, MAC addresses, and/or other suitable addresses. To facilitate communications among the virtual machines 144, virtual switches (not shown) can be configured to switch or filter packets 114 directed to different virtual machines 144 via the network interface card 136 and facilitated by the packet processor 138.

As shown in FIG. 2, to facilitate communications with one another or with external devices, the individual hosts 106 can also include a network interface card ("NIC") 136 for interfacing with a computer network (e.g., the underlay network 108 of FIG. 1). A NIC 136 can include a network adapter, a LAN adapter, a physical network interface, or other suitable hardware circuitry and/or firmware to enable communications between hosts 106 by transmitting/receiving data (e.g., as packets) via a network medium (e.g., fiber optic) according to Ethernet, Fibre Channel, Wi-Fi, or other suitable physical and/or data link layer standards. During operation, the NIC 136 can facilitate communications to/from suitable software components executing on the hosts 106. Example software components can include the virtual switches 141, the virtual machines 144, applications 147 executing on the virtual machines 144, the hypervisors 140, or other suitable types of components.

In certain implementations, a packet processor 138 can be interconnected to and/or integrated with the NIC 136 to facilitate network traffic operations for enforcing communications security, performing network virtualization, translating network addresses, maintaining/limiting a communication flow state, or performing other suitable functions. In certain implementations, the packet processor 138 can include a Field-Programmable Gate Array ("FPGA") integrated with the NIC 136.

An FPGA can include an array of logic circuits and a hierarchy of reconfigurable interconnects that allow the logic circuits to be "wired together" like logic gates by a user after manufacturing. As such, a user 101 can configure logic blocks in FPGAs to perform complex combinational functions, or merely simple logic operations to synthetize equivalent functionality executable in hardware at much faster speeds than in software. In the illustrated embodiment, the packet processor 138 has one interface communicatively coupled to the NIC 136 and another coupled to a network switch (e.g., a Top-of-Rack or "TOR" switch) at the other. In other embodiments, the packet processor 138 can also include an Application Specific Integrated Circuit ("ASIC"), a microprocessor, or other suitable hardware circuitry. In any of the foregoing embodiments, the packet processor 138 can be programmed by the processor 132 (or suitable software components associated therewith) to route packets inside the packet processor 138 to achieve various aspects of time-sensitive data delivery, as described in more detail below with reference to FIGS. 3A-5B.

In operation, the processor 132 and/or a user 101 (FIG. 1) can configure logic circuits in the packet processor 138 to perform complex combinational functions or simple logic operations to synthetize equivalent functionality executable in hardware at much faster speeds than in software. For example, the packet processor 138 can be configured to process inbound/outbound packets for individual flows according to configured policies or rules contained in a flow table such as a MAT. The flow table can contain data representing processing actions corresponding to each flow for enabling private virtual networks with customer supplied address spaces, scalable load balancers, security groups and Access Control Lists ("ACLs"), virtual routing tables, bandwidth metering, Quality of Service ("QoS"), etc.

As such, once the packet processor 138 identifies an inbound/outbound packet as belonging to a particular flow, the packet processor 138 can apply one or more corresponding policies in the flow table before forwarding the processed packet to the NIC 136 or TOR 112. For example, as shown in FIG. 2, the application 147, the virtual machine 144, and/or other suitable software components on the source host 106a can generate an outbound packet 114 destined to, for instance, other applications 147 at the destination hosts 106b and 106b'. The NIC 136 at the source host 106a can forward the generated packet 114 to the packet processor 138 for processing according to certain policies in a flow table. Once processed, the packet processor 138 can forward the outbound packet 114 to the first TOR 112a, which in turn forwards the packet to the second TOR 112b via the overlay/underlay network 108 and 108'.

The second TOR 112b can then forward the packet 114 to the packet processor 138 at the destination hosts 106b and 106b' to be processed according to other policies in another flow table at the destination hosts 106b and 106b'. If the packet processor 138 cannot identify a packet as belonging to any flow, the packet processor 138 can forward the packet to the processor 132 via the NIC 136 for exception processing. In another example, when the first TOR 112a receives an inbound packet 115, for instance, from the destination host 106b via the second TOR 112b, the first TOR 112a can forward the packet 115 to the packet processor 138 to be processed according to a policy associated with a flow of the packet 115. The packet processor 138 can then forward the processed packet 115 to the NIC 136 to be forwarded to, for instance, the application 147 or the virtual machine 144.

Transmission of the inbound and outbound packets 114 and 115 may experience delays between transmission and reception of such packets 114 and 115. Such delays are generally referred to a latency in the distributed computing system 100. Latency estimation can be used to facilitate various aspects of operations in the distributed computing system 100. For example, during a clock synchronization process, packets of a synchronization message can be transmitted from the source host 106a to the destination host 106b with a timestamp that is offset by an estimated latency between the source and destination hosts 106a and 106b.

Figure 3A:
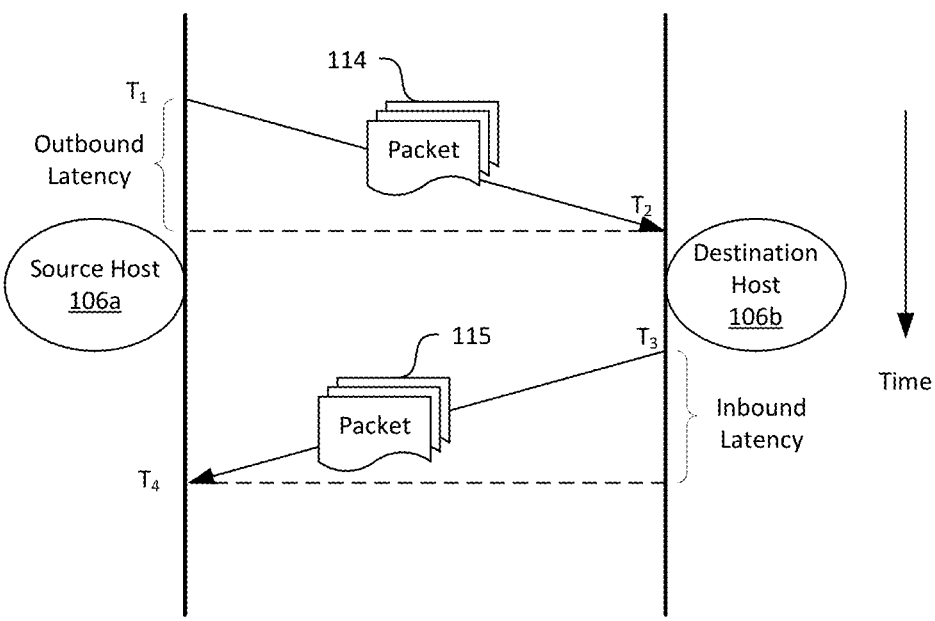
FIGS. 3A and 3B are schematic diagrams illustrating certain example operations of network latency estimation in a distributed computing system in accordance with embodiments of the disclosed technology.

FIG. 3A is an example timing diagram illustrating the source host 106a transmitting an outbound packet 114 to the destination host 106b and receiving a reply from the destination host 106b as an inbound packet 115 along symmetrical network paths. As shown in FIG. 3A, at time T1, the source host 106a can transmit an outbound packet 114 to the destination host 106b. At time T2, the destination host 106b receives the outbound packet 114. After a period of processing the outbound packet 114, the destination host 106b transmits a response as an inbound packet 115 to the source host 106a at time T3. At time T4, the source host 106a receives the inbound packet 115 from the destination host 106b. As such, in the illustrated example, the outbound latency equals to a difference between T2 and T1 while an inbound latency equals to a difference between T4 and T3. The sum of the outbound and inbound latency equal to the RTT between the source and destination hosts 106a and 106b.

Figure 3B:
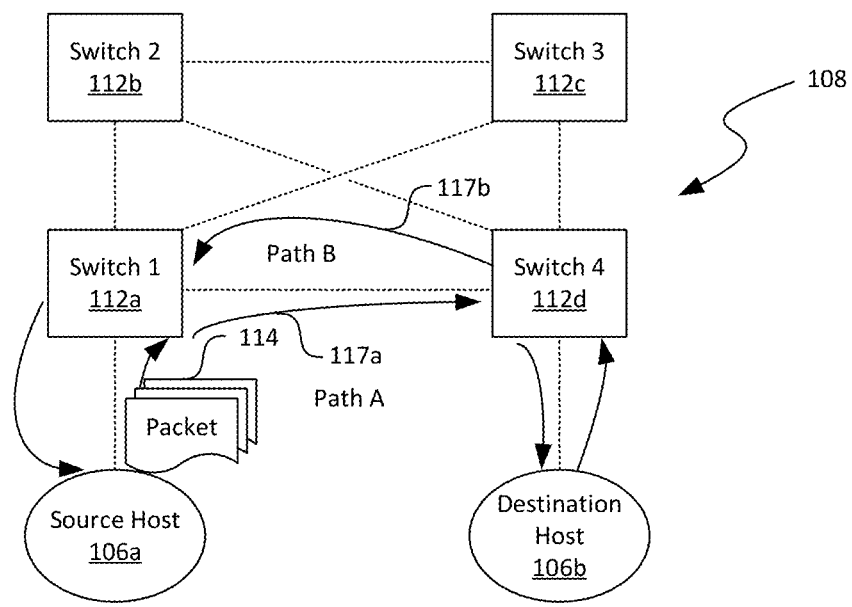

In the example timing diagram illustrated in FIG. 3A, the inbound latency generally equals to the outbound latency. FIG. 3B is a schematic diagram illustrates one scenario under which the inbound and outbound latency can be generally equal. As shown in FIG. 3B, the underlay network 108 includes a computer network having network nodes such as switches 1-4 112a-112d, respectively, that interconnect the source host 106a and the destination host 106b. During operation, the outbound packet 114 can traverse the underlay network 108 via switch 1 112a, switch 4 112d before arriving at the destination host 106b. As such, the outbound network path 117a is as follows:

Source host 106a→Switch 1→Switch 4→Destination host 106b

Similarly, the inbound packet 114 can traverse the underlay network 108 via switch 4 112d and switch 1 112a before arriving at the source host 106a to form an inbound network path 117b as follows:

Destination host 106b→Switch 4→Switch 1→Source host 106a

As such, the inbound and outbound network path 117a and 117b include the same network nodes 112 (i.e., switch 1 and switch 4) in the same sequence but in reverse directions. The example inbound and outbound network paths 117a and 117b can be referred to as being symmetrical.

Typically, the latency controller 125 (FIG. 1) can estimate the latency offset by dividing a round trip time (RTT) between the source and destination hosts 106a and 106b by two. The RTT is typically measured as follows:

$$RTT=(t4-t1)-(t3-t2)$$

where t1 is a timestamp of a request packet transmission from the source host 106a; t2 a timestamp of a request packet reception at the destination host 106b; t3 is a timestamp of the response packet transmission from the destination host 106b; and t4 is a timestamp of the response packet reception at the source host 106a. As such, assuming no clock rate offset or "drift" between the source and destination hosts 106a and 106b, the clock at the destination host 106b can be set as follows:

$$t2 = t1 + \frac{RTT}{2}$$

Figure 4A:
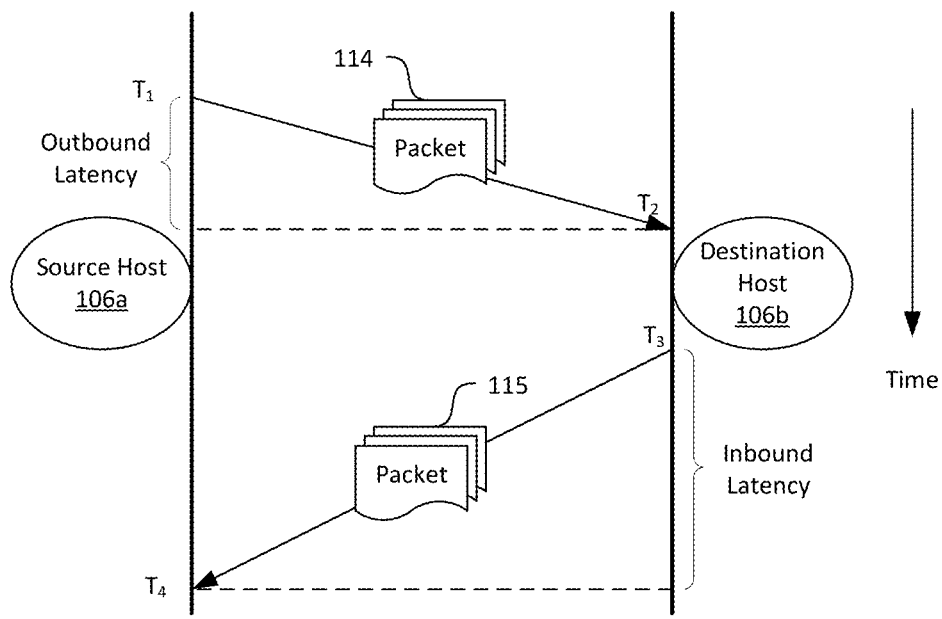
FIGS. 4A and 4B are schematic diagrams illustrating certain example operations of implementing network latency estimation in accordance with embodiments of the disclosed technology.

The foregoing clock synchronization technique assumes that a single direction path latency between the source host 106a and destination host 106b is half of the measured RTT. This assumption, however, may not be accurate under certain scenarios. For example, when the outbound packet 114 is transmitted from the source host 106a to the destination host 106b, the outbound packet 114 may traverse the underlay network 108 along an outbound network path that is different than an inbound network path through which the inbound packet 115 is transmitted. FIG. 4A is an example timing diagram illustrating the source host 106a transmitting an outbound packet 114 to a destination host 106b and receiving a reply from the destination host 106b as an inbound packet 115 along asymmetrical network paths. As shown in FIG. 4A, the inbound latency (i.e., a difference between T4 and T3) can be much larger than the outbound latency (i.e., a difference between T2 and T1).

Figure 4B:
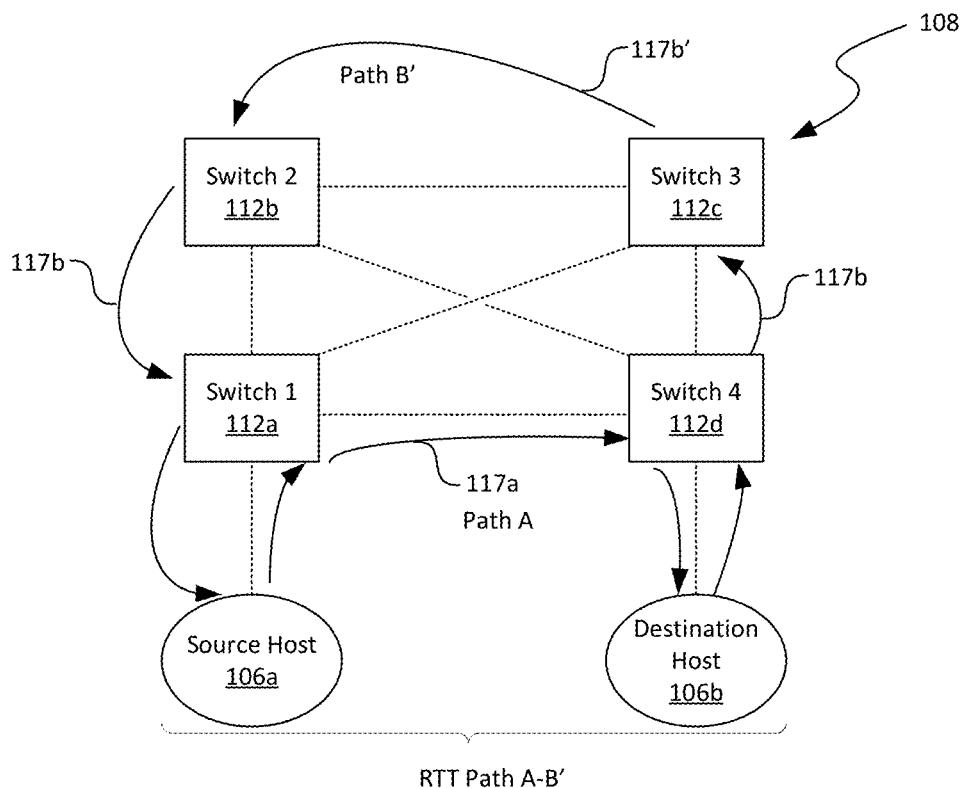

Such difference can be caused by the inbound network path having different network nodes 112 (FIG. 1) and/or sequence of the network nodes 112. FIG. 4B is a schematic diagram illustrates one scenario under which the inbound latency may be greater than the outbound latency. As shown in FIG. 4B, the outbound network path 117a is the same as that shown in FIG. 3B while the inbound network path 117b' is different than that shown in FIG. 3B. Instead, the inbound network path 117b' includes the following:

Destination host 106b→Switch 4→Switch 3→Switch 2→Switch 1→Source host 106a

As such, the inbound network path 117b' is much longer than the outbound network path 117a and thus may contribute to the inbound latency being much larger than the outbound latency. As such, the assumption of equal inbound and outbound network latency would cause the clock synchronization between the source and destination hosts 106a and 106b to be inaccurate.

Several embodiments of the disclosed technology can address several aspects of the foregoing difficulties by implementing a traceroute technique to assign a single path network latency to the inbound or outbound network path 117a and 117b'. In certain implementations, when measuring an RTT between the source host 106a and the destination host 106b, the latency controller 125 (FIG. 1) can be configured to cause the source host 106a and destination host 106b to issue a traceroute command between the source host 106a and destination host 106b, respectively. The traceroute command can be implemented to identify and store inbound and outbound network paths 117a and 117b' of the round-trip route between the source host 106a and the destination host 106b. The inbound and outbound paths 117a and 117b' can be identified by one or more network identifiers (e.g., IP addresses, MAC addresses, etc.) of network devices (e.g., switches, routers, etc.) in the underlay network 108 (FIG. 1) between the source host 106a and destination host 106b. In other implementations, the source and destination hosts 106a and 106b can be programmed to perform the traceroute operations automatically, periodically, or in other suitable manners.

In general, a traceroute command is an example of a network diagnostic function that can be used to identify a network path that a packet takes from a source to a destination. The traceroute function typically lists the intermediate network nodes 112 (FIG. 1) between, for example, the source and destination that the packet passes through until either the packet reaches the destination or fails to reach the destination and is discarded. The traceroute function operates by causing each network node 112 along a network path to return a message such as an ICMP message to the source (e.g., the source host 106a) that invoked the traceroute function. A packet typically contains a time-to-live (TTL) value which specifies how many hops that the packet can traverse before it expires. Each time a packet passes through a network device, the TTL value of the packet is decremented by a preset amount (e.g., one). When the TTL value of the packet expires (e.g., the TLL value reaches zero) at an intermediate network device, the network device discards the packet and transmit a "TTL Exceeded" message to the source that invokes the traceroute function.

The traceroute function typically operates over Internet Protocol (IP) networks using IP datagrams. In some embodiments, the source may use the traceroute function to send a series of ICMP Echo Request packet with different TTL values to identify intermediate network nodes 112. For example, the source may invoke the traceroute function to initially send a first packet from the source with a TTL value of one to a destination. The first network device along the network path decrements the TTL of the first packet to zero and discards the first packet because the TTL has expired. The first network device then returns a "TTL Exceeded" message to the source. Based on the returned "TTL Exceeded" message, the source can identify that the first network device as a first hop on the network path to the destination. The source can then send a second packet with a TTL value of two to the destination. Upon receiving the second packet, the first network device along the network path decrements the TTL of the second packet to one and forwards the second packet to a second network device in the network path. Upon receiving the second packet, the second network device along the network path decrements the TTL of the second packet to zero and discards the second packet because the TTL has expired. The second network device then returns a "TTL Exceeded" message to the source. Based on the returned "TTL Exceeded" message from the second network device, the source can identify the second network device as the second hop on the network path from the source to the destination.

The source can then send additional packets with a TTL of three, four, five, and so on to the destination, causing each subsequent network devices along the network path to return a "TTL Exceeded" message. Thus, based on the "TTL Exceeded" messages from the subsequent network devices, the source can discover intermediate hops in the network path (referred to as "outbound network path") until either the destination is reached or the maximum TTL value is reached and the traceroute operation ends. The destination can also invoke the same traceroute function to discover intermediate network devices from the destination to the source (referred to as "inbound network path). As discussed in more detail below, packets with the same or substantially similar 5-tuple (e.g., a source IP address, a destination IP address, a source port, a destination port, and a transport protocol) may be used to traverse the same intermediate network devices or connections as an original flow of packets along a network path. The source and destination can then report to the latency controller a network route having both the inbound and outbound network paths between the source and destination.

Upon obtaining data of the network routes, the latency controller 125 can be configured to determine whether the inbound and outbound network paths 117a and 117b are symmetrical. In response to determining that the inbound and outbound network paths 117a and 117b are symmetrical (as shown in FIG. 3B), the latency controller 125 can be configured to indicate and set the latency offset to be one half of a measured RTT between the source host 106a and destination host 106b. In response to determining that the inbound and outbound network paths 117a and 117b' are asymmetrical (as shown in FIG. 4B), the latency controller 125 can be configured to indicate that the assumption of equal inbound and outbound latency is inaccurate.

Figure 5A:
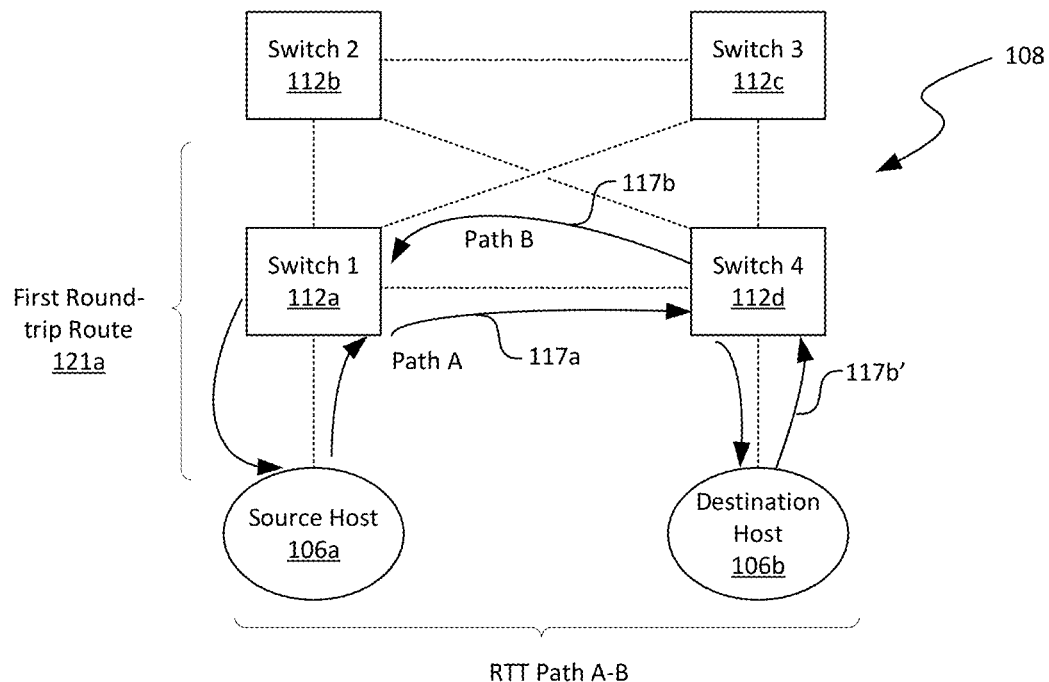
FIGS. 5A and 5B are schematic diagrams illustrating certain example operations of network latency estimation in a distributed computing system in accordance with embodiments of the disclosed technology.
Figure 5B:
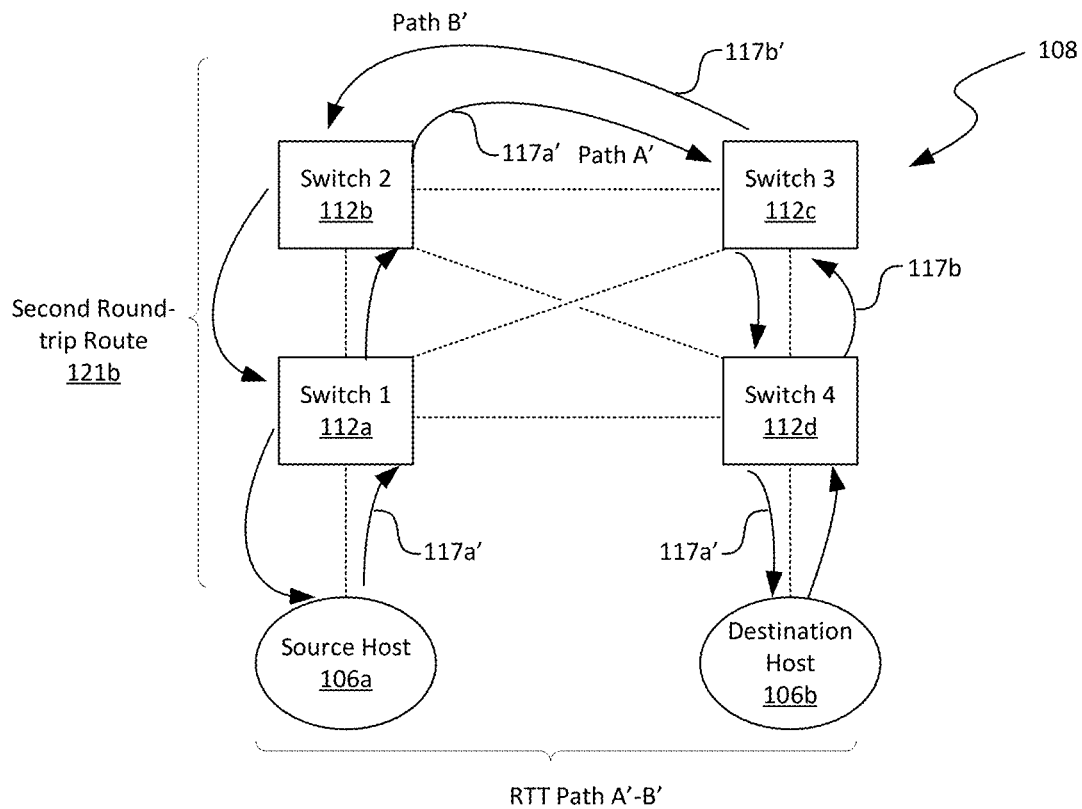

The latency controller 125 can also be configured to cause the source host 106a and the destination host 106b to perform additional traceroute operations and RTT measurements for a pair of additional symmetrical round-trip routes constructed based on the inbound and outbound network paths 117a and 117b' of the asymmetrical network paths shown in FIG. 4B. For example, as shown in FIG. 5A, a first symmetrical round-trip route 121a can be constructed using the outbound network path 117a and a new inbound network path 117b that is the reverse of the outbound network path 117a. As shown in FIG. 5B, a second symmetrical round-trip route 121b can be constructed using the inbound network path 117b' and a new outbound network path 117a' that is the reverse of the inbound network path 117b'.

Packets can be directed to follow the first and second symmetrical round-trip routes by manipulating 5-tuples of the packets or via other suitable means while RTTs are measured. By comparing the measured RTTs (shown in FIGS. 5A and 5B as "RTT Path A-A" and "RTT Path B'-B'"), the latency controller can be configured to deduct a latency difference (θ) between the inbound network path 117a and the outbound network path 117b' as follows:

$$\theta = \frac{RTT1 - RTT2}{2}$$

where RTT1 is the RTT of the first symmetrical round-trip route RTT Path A-A while RTT2 is the RTT of the second symmetrical round-trip route RTT Path B'-B'. Having the latency difference between the inbound and outbound network paths 117a and 117b', the latency controller 125 can then adjust the latency offset for a synchronization packet as follows:

$$t2 = t1 + \frac{RTT}{2} + \theta$$

where RTT is the round-trip time between the source host 106a and destination host 106b; t1 is the clock time at the source host 106a; and t2 is the clock time on the destination host 106b.

In other implementations, instead of constructing and directing packets to follow the two constructed first and second symmetrical round-trip routes 121a and 121b, the latency controller 125 can be configured to continue monitoring traceroute data from the source host 106a, the destination host 106b, or other hosts 106 (shown in FIGS. 1 and 2) in the computer network 108 for network routes (or partial routes) that at least approximately match (e.g., >90%, >95%, >99%, 100%, or other suitable thresholds) the first and second symmetrical round-trip routes 121a and 121b. Such traceroute data can then be used to estimate latency difference between the asymmetrical inbound and outbound network paths 117a and 117b', as described above. In further implementations, traceroute data of only one of the first or second symmetrical round-trip routes 121a or 121b may be used to estimate the latency difference by subtracting the RTT of the first or second symmetrical round-trip routes 121a or 121b from the RTT of the asymmetric round-trip route between the source host 106a and the destination host 106b, or vice versa.

Several embodiments of the disclosed latency estimation technique can thus accommodate differences between the inbound and outbound network paths 117a and 117b' of a round-trip route between a source host 106a and a destination host 106b. By constructing and measuring RTTs of the first and second symmetrical round-trip routes 121a and 121b shown in FIGS. 5A and 5B, respectively, using the asymmetrical inbound and outbound network paths 117a and 117b', the latency difference between the inbound and outbound network paths 117a and 117b' can be estimated or measured. As such, latency estimation between inbound and outbound network traffic between the source host 106a and destination host 106b can be more accurate than assuming that the latency is the same for both the inbound and outbound network traffic.

Figure 6A:
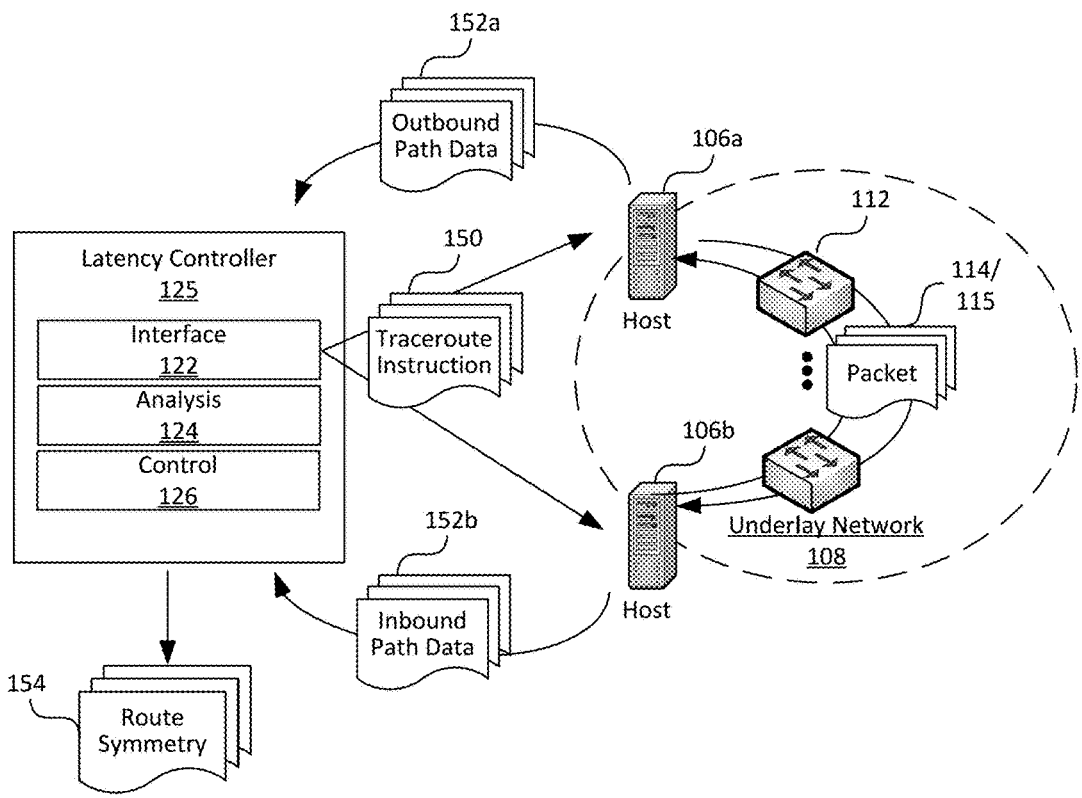
FIGS. 6A and 6B are schematic block diagram illustrating example components of the latency controller in FIG. 1 in accordance with embodiments of the disclosed technology.
Figure 6B:
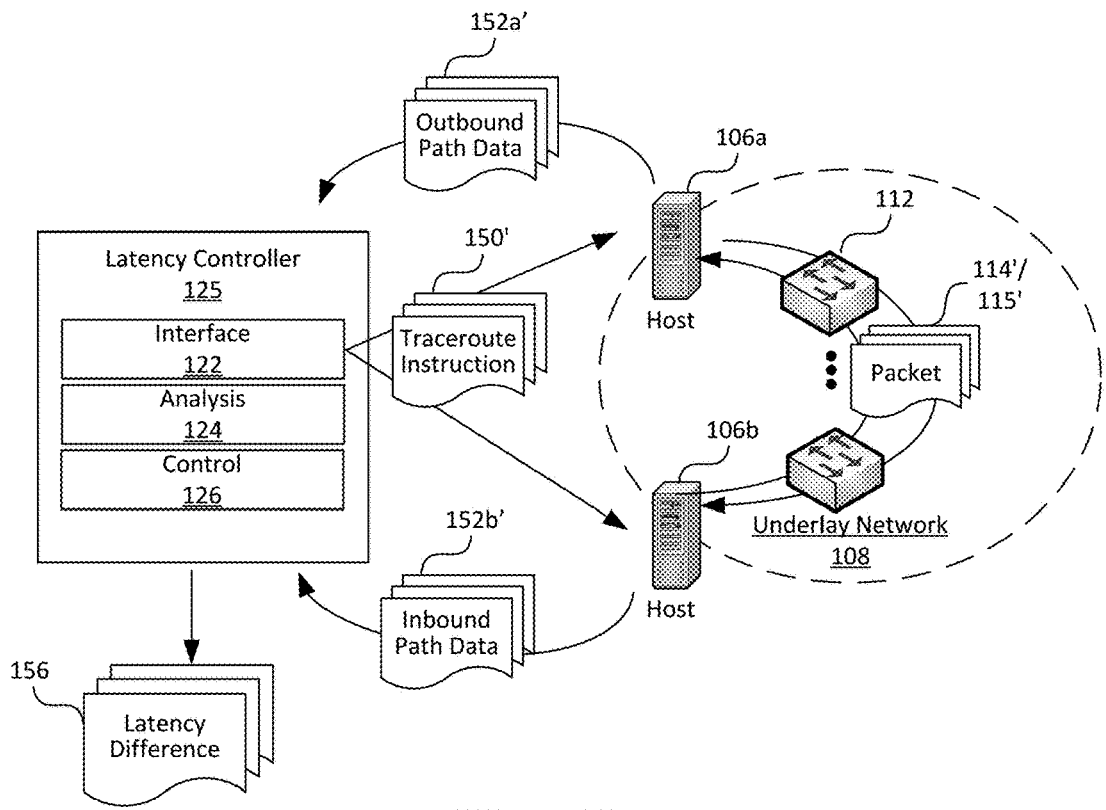

FIGS. 6A and 6B are schematic block diagram illustrating example components of the latency controller 125 in FIG. 1 in accordance with embodiments of the disclosed technology. As shown in FIG. 6A, the latency controller 125 can include an interface component 122, an analysis component 124, and a control component 126 operatively coupled to one another. Though particular components are shown in FIG. 6A, in other embodiments, the latency controller 125 can include additional and/or different components.

As shown in FIG. 6A, in certain embodiments, the interface component 122 can be configured to transmit traceroute instructions 150 to the source and destination hosts 106a and 106b periodically, on demand, or in other suitable manners. The traceroute instructions 150 can cause the source and destination hosts 106a and 106b to perform traceroute type operations by, for instance, executing a traceroute command. As such, the source and destination hosts 106a and 106b can each transmit a series of packets 114 and 115 to list intermediate network nodes 112 in the underlay network 108, as described above with reference to FIGS. 3A-4B. Upon completion of the traceroute operations, the source and destination hosts 106a and 106b can transmit outbound path data 152a and inbound path data 152b, respectively, to the latency controller 125 for analysis. In other embodiments, the source and destination hosts 106a and 106b can be configured to perform the foregoing traceroute operations automatically, based on instructions from another entity (not shown) in the distributed computing system 100 (FIG. 1), or in other suitable manners.

Upon receiving the inbound and outbound path data 152a and 152b, the analysis component 124 of the latency controller 125 can be configured to determine whether a round-trip route between the source and destination hosts 106a and 106b is symmetrical, as described in more detail above with reference to FIGS. 3A-4B. Upon determining whether the route-trip route is symmetrical or asymmetrical, the analysis component 124 can instruct the control component 126 to issue notification 154 regarding the route symmetry of the round-trip route accordingly to the source and destination hosts 106a and 106b or other suitable entities in the distributed computing system 100.

In response to determining that the round-trip route between the source and destination hosts 106a and 106b is not symmetrical, the analysis component 124 can be configured to construct two symmetrical route-trip routes using the inbound and outbound network paths in the original round-trip route, as described in more detail above with reference to FIGS. 5A and 5B. The analysis component 124 can be configured to instruct the control component 126 to issue additional traceroute instructions 150' to the source and destination hosts 106a and 106b to perform additional traceroute operations. The additional traceroute instructions 150' can also include data representing 5-tuples corresponding to each of the inbound and outbound network paths such that the new round-trip routes are symmetrical.

In response, the source and destination hosts 106a and 106b can perform additional traceroute operations described above by, for instance, transmitting additional packets 114' and 115' to each other. Upon completion of the additional traceroute operations, the source and destination hosts 106a and 106b can be configured to transmit additional inbound and outbound path data 152a' and 152b' of the new symmetrical round-trip routes to the latency controller 125. The analysis component 124 can be configured to then analyze the additional inbound and outbound path data 152a' and 152b' to determine a latency difference 156 between the inbound and outbound network path, as described in more detail above with reference to FIGS. 5A and 5B. The interface component 125 can then be configured to provide the determined latency difference 156 to the source and destination hosts 106a and 106b, or other suitable entities in the distributed computing system 100.

In further embodiments, the analysis component 124 can be configured to determine a latency of a link between a pair of network nodes 112 in the underlay network 108 using a dataset from a number of network nodes 112. For instance, a traceroute result of a symmetrical route and a corresponding RTT can be one projection of latency in the underlay network 108. By obtaining many such projections, a per link latency may be determined using Tomographic reconstruction or other suitable techniques.

In yet further embodiments, the source and destination hosts 106a and 106b can also be configured to expose an operating temperature and/or an environmental temperature to the latency controller 125. Without being bound by theory, it is believed that timing (e.g., a clock offset, a clock interval, etc.) of digital clocks in computer servers can be influenced by temperature changes at the computer servers. Correlations between timing of a clock on a host and an operating/environmental temperature can be developed using historical measurements or via other suitable methods. As such, using such correlations, the analysis component 124 of the latency controller 125 (or other suitable components in the distributed computing system 100) can empirically or otherwise determine one or more clock correction factors (e.g., offset, frequency, timing, etc.) based on a current temperature of the source or destination host 106a or 106b and/or one or more components thereof. Thus, accuracy of clock synchronization can be further improved. The information needed for such clock correction might be acquired using an API call to the source and destination hosts 106a and 106b and other hosts 106 in the distributed computing system 100. The latency controller 125 can also be configured to determine the temperature of one or more components (e.g., a CPU) on a host 106 to further improve estimate of the drift a clock source is experiencing due to thermal factors.

Figure 7A:
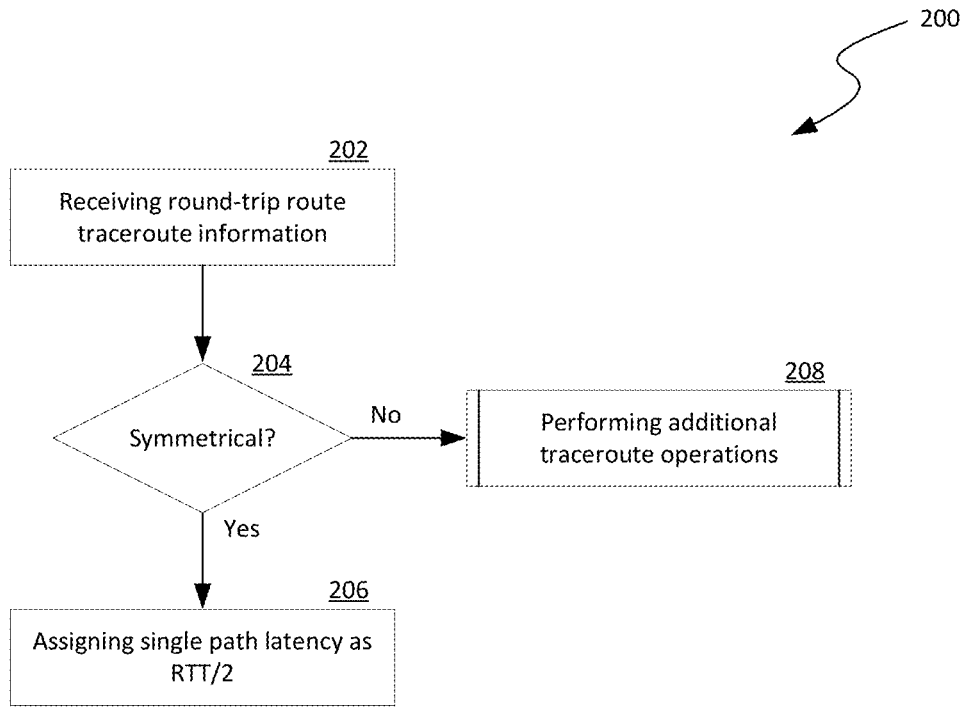
FIGS. 7A and 7B are flowcharts illustrating certain processes of network latency estimation in accordance with embodiments of the disclosed technology.
Figure 7B:
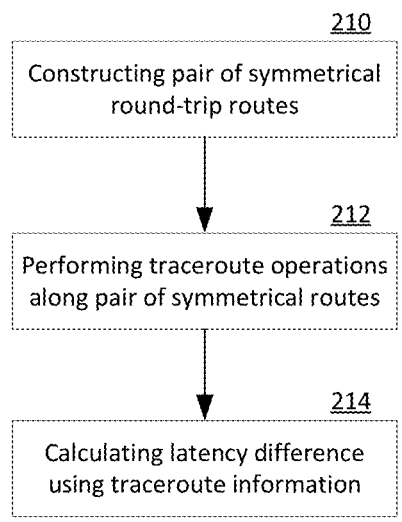

FIGS. 7A and 7B are flowcharts illustrating certain processes of network latency estimation in accordance with embodiments of the disclosed technology. Though the processes are described below in the context of the distributed computing system 100 of FIG. 1, in other embodiments, the processes or aspects thereof can be implemented in computing systems with additional and/or different components.

As shown in FIG. 7A, a process 200 can include receiving traceroute information of a round-trip route between a source node and a destination node at stage 202. Various techniques of performing traceroute operations between the source and destination nodes are described above with reference to FIGS. 3A-5B. The traceroute information can identify an outbound network path with a sequence of network nodes 112 (FIG. 1) from the source node to the destination node and an inbound network path with a sequence of network nodes 112 from the destination node to the source node.

The process 200 can then include a decision stage 204 to determine whether the round-trip route is symmetrical. In certain embodiments, the round-trip route is symmetrical when the sequence of network nodes of the inbound network path is identical or substantially identical (e.g., greater than about 95% match) to the sequence of network nodes of the outbound network path in the reverse direction. In other embodiments, the round-trip route can be indicated as symmetrical when the inbound and outbound network paths are matched greater than 80%, 85%, 90%, or other suitable thresholds.

In response to determining that the round-trip route is symmetrical, the process 200 can include assigning a single path latency of RTT/2 to both the inbound and outbound network paths of the round-trip route at stage 206. Otherwise, the process 200 can proceed to performing additional traceroute operations at stage 208 to deduce or estimate a latency difference between the inbound and outbound network paths. Example operations of performing the additional traceroute operations are described below with reference to FIG. 7B.

As shown in FIG. 7B, the example operations can include constructing a pair of new round-trip routes using the asymmetrical inbound and outbound network paths of the original round-trip route at stage 210. Illustrating examples of constructing such new round-trip routes are described above with reference to FIGS. 5A and 5B. The operations can then include instructing the source and destination nodes to perform additional traceroute operations along the new round-trip routes at stage 212. During performance of the additional traceroute operations, 5-tuples of packets can be manipulated to follow the new round-trip routes between the source and destination nodes. Upon completion of the additional traceroute operations, the operations can include calculating a latency difference between the inbound and outbound network paths, for instance, as one half of the difference between RTTs of the pair of new round-trip routes at stage 214.

Figure 8:
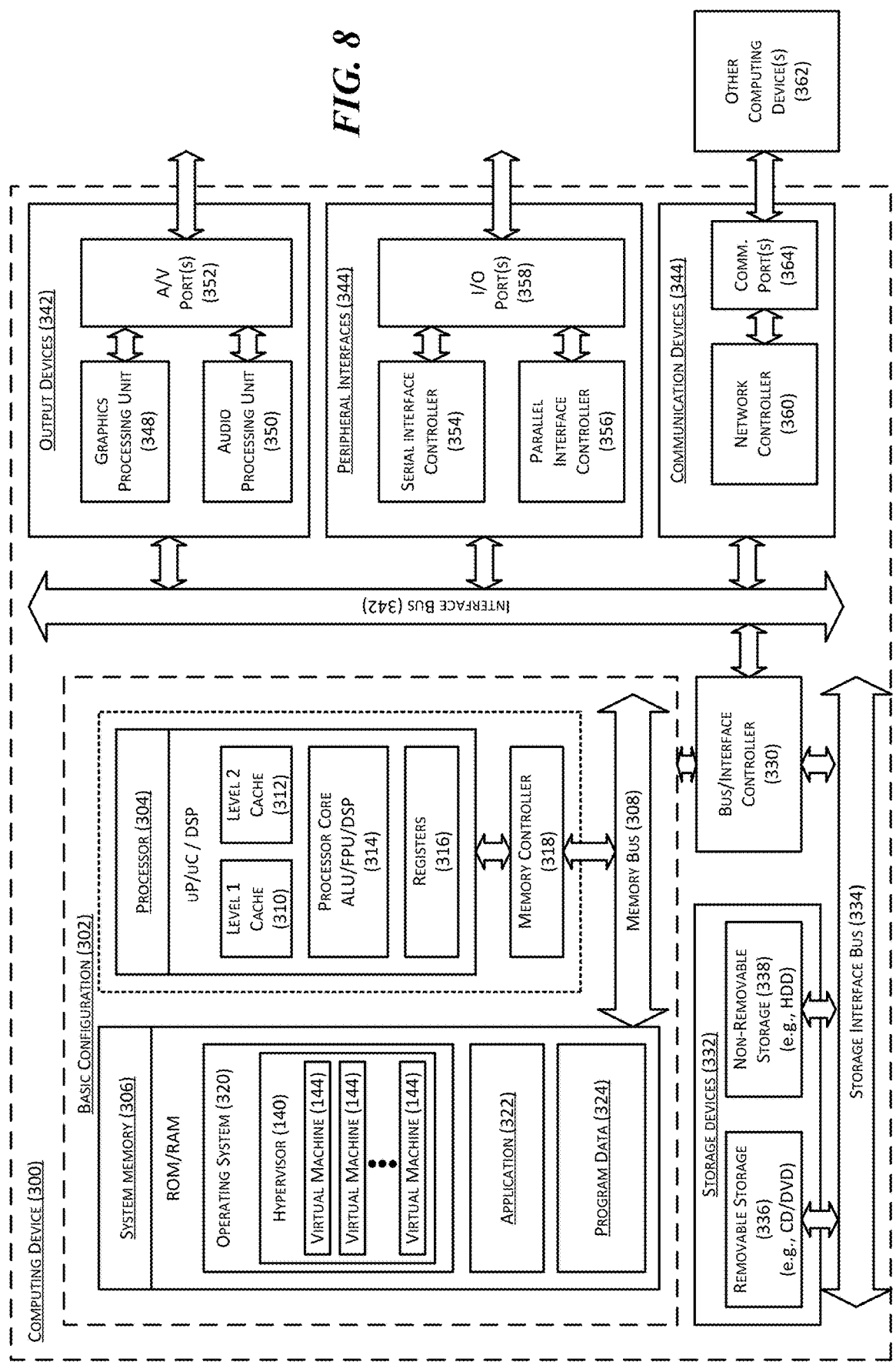
FIG. 8 is a computing device suitable for certain components of the distributed computing system in FIG. 1.

FIG. 8 is a computing device 300 suitable for certain components of the distributed computing system 100 in FIG. 1. For example, the computing device 300 can be suitable for the hosts 106, the client devices 102, or the latency controller 125 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 11, the operating system 320 can include a hypervisor 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable, and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information, and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless webwatch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

I claim:

1. A method of network latency estimation in a distributed computing system having a first node and a second node interconnected by a computer network having multiple network devices, comprising:
    receiving data representing traceroute information of an existing round-trip route in the computer network between the first node and the second node, the existing round-trip route includes an outbound network path from the first node to the second node and an inbound network path from the second node to the first node;
    determining whether the existing round-trip route is symmetrical or asymmetrical based on the received traceroute information of the existing round-trip route;
    in response to determining that the existing round-trip route is symmetrical, assigning a latency value to both the inbound and outbound network paths, wherein the assigned latency value equals to one half of a round-trip time between the first and second nodes; and
    in response to determining that the existing round-trip route between the first node and the second node is asymmetrical,
        instructing the first and second nodes to individually perform additional traceroute operations along a first round-trip route and a second round-trip route between the first and second nodes, wherein:
            the first round-trip route includes the inbound network path of the existing round-trip route and an outbound network path that is a reverse of the inbound network path of the existing round-trip route; and
            the second round-trip route has the outbound network path of the existing round-trip route and an inbound network path that is a reverse of the outbound network path of the existing round-trip route;
        receiving additional traceroute information from the additional traceroute operations performed by the first and second nodes; and
        determining the latency difference between the inbound and outbound network paths of the existing round-trip route based on the received additional traceroute information.

2. The method of claim 1 wherein:
    the additional traceroute information includes a first round trip time (RTT1) of the first round-trip route and a second round trip time (RTT2) of the second round-trip route; and
    determining the latency difference includes calculating the latency difference ($\theta$) between the inbound network path and the outbound network path of the existing round-trip route between the first and second nodes as follows:

$$\theta = \frac{RTT1 - RTT2}{2}.$$

3. The method of claim 1 wherein:
    the additional traceroute information includes a first round trip time (RTT1) of the first round-trip route and a second round trip time (RTT2) of the second round-trip route; and
    determining the latency difference includes calculating the latency difference ($\theta$) between the inbound network path and the outbound network path of the existing round-trip route between the first and second nodes as follows:

$$\theta = \frac{RTT1 - RTT2}{2};$$

and
    the method further includes adjusting a latency offset between a clock on the first node and another clock on the second node as follows:

$$t2 = t1 + \frac{RTT}{2} + \theta$$

where RTT is a round-trip time between the first and second nodes along the existing round-trip route; t1 is a clock time at the first node; and t2 is a clock time on the second node.

4. The method of claim 1 wherein instructing the first and second nodes includes instructing the first and second nodes to manipulating 5-tuples of packets to be transmitted between the first and second nodes to follow the first and second round-trip routes.

5. The method of claim 1, further comprising:
    receiving further traceroute information of further symmetrical round-trip routes in the computer network; and
    applying Tomographic reconstruction to the received traceroute information to derive a per link latency between a pair of the network devices in the computer network.

6. The method of claim 1, further comprising:
    receiving, from the first and second nodes, first and second operating temperatures at the first and second nodes, respectively; and
    adjusting a timing interval of a clock on the first node or second node based on a correlation of the received first and second operating temperatures to a clock drift.

7. A computing device in a distributed computing system having a first node and a second node interconnected by a computer network having multiple network devices, the computing device comprising:
a processor; and
a memory operatively coupled to the processor, the memory containing instructions executable by the processor to cause the computing device to:
upon receiving data representing traceroute information of an existing round-trip route in the computer network between the first node and the second node,
determine whether the existing round-trip route is symmetrical or asymmetrical based on the received traceroute information of the existing round-trip route;
in response to determining that the existing round-trip route is symmetrical, assign a latency value to both the inbound and outbound network paths, wherein the assigned latency value equals to one half of a round-trip time between the first and second nodes; and
in response to determining that the existing round-trip route is asymmetrical based on the received traceroute information of the existing round-trip route,
instruct the first and second nodes to individually perform traceroute operations along a first round-trip route and a second round-trip route between the first and second nodes, wherein:
the first round-trip route includes an inbound network path of the existing round-trip route between the first and second nodes and an outbound network path that is a reverse of the inbound network path of the existing round-trip route; and
the second round-trip route has an outbound network path of the existing round-trip route and an inbound network path that is a reverse of the outbound network path of the existing round-trip route; and
upon receiving additional traceroute information from the additional traceroute operations performed by the first and second nodes, determine a latency difference between the inbound and outbound network paths of the existing round-trip route based on the received additional traceroute information.

8. The computing device of claim 7 wherein:
the additional traceroute information includes a first round trip time (RTT1) of the first round-trip route and a second round trip time (RTT2) of the second round-trip route; and
to determine the latency difference includes to calculate the latency difference (θ) between the inbound network path and the outbound network path of the existing round-trip route between the first and second nodes as follows:

$$\theta = \frac{RTT1 - RTT2}{2}.$$

9. The computing device of claim 7 wherein:
the additional traceroute information includes a first round trip time (RTT1) of the first round-trip route and a second round trip time (RTT2) of the second round-trip route; and
to determine the latency difference includes to calculate the latency difference (θ) between the inbound network path and the outbound network path of the existing round-trip route between the first and second nodes as follows:

$$\theta = \frac{RTT1 - RTT2}{2};$$

and
the memory includes additional instructions executable by the processor to cause the computing device to adjust a latency offset between a clock on the first node and another clock on the second node as follows:

$$t2 = t1 + \frac{RTT}{2} + \theta$$

where RTT is a round-trip time between the first and second nodes along the existing round-trip route; t1 is a clock time at the first node; and t2 is a clock time on the second node.

10. The computing device of claim 7 wherein to instruct the first and second nodes includes to instruct the first and second nodes to manipulating 5-tuples of packets to be transmitted between the first and second nodes to follow the first and second round-trip routes.

11. A method of network latency estimation in a distributed computing system having a first node and a second node interconnected by a computer network having multiple network devices, comprising:
receiving data representing traceroute information of an existing round-trip route in the computer network between the first node and the second node, the existing round-trip route includes an outbound network path from the first node to the second node and an inbound network path from the second node to the first node;
determining whether the inbound network path is a reverse of the outbound network path of the existing round-trip route; and
in response to determining that the inbound network path is a reverse of the outbound network path of the existing round-trip route, assigning a latency value to both the inbound and outbound network paths, wherein the assigned latency value equals to one half of a round-trip time between the first and second nodes; and
in response to determining that the inbound network path is not a reverse of the outbound network path of the existing round-trip route,
instructing the first and second nodes to individually perform additional traceroute operations along a first round-trip route and a second round-trip route between the first and second nodes, wherein:
the first round-trip route includes the inbound network path of the existing round-trip route and an outbound network path that is reverse of the inbound network path of the existing round-trip route; and
the second round-trip route has the outbound network path of the existing round-trip route and an inbound network path that is reverse of the outbound network path of the existing round-trip route;

receiving additional traceroute information from the additional traceroute operations performed by the first and second nodes; and determining a latency difference between the inbound and outbound network paths of the existing round-trip route based on the received additional traceroute information.

12. The method of claim 11 wherein:

the additional traceroute information includes a first round trip time (RTT1) of the first round-trip route and a second round trip time (RTT2) of the second round-trip route; and to determine the latency difference includes to calculate the latency difference (θ) between the inbound network path and the outbound network path of the existing round-trip route between the first and second nodes as follows:

$$\theta = \frac{RTT1 - RTT2}{2}.$$

13. The method of claim 11 wherein:

the additional traceroute information includes a first round trip time (RTT1) of the first round-trip route and a second round trip time (RTT2) of the second round-trip route; and to determine the latency difference includes to calculate the latency difference (θ) between the inbound network path and the outbound network path of the existing round-trip route between the first and second nodes as follows:

$$\theta = \frac{RTT1 - RTT2}{2};$$

and the memory includes additional instructions executable by the processor to cause the computing device to adjust a latency offset between a clock on the first node and another clock on the second node as follows:

$$t2 = t1 + \frac{RTT}{2} + \theta$$

where RTT is a round-trip time between the first and second nodes along the existing round-trip route; t1 is a clock time at the first node; and t2 is a clock time on the second node.

14. The method of claim 11 wherein to instruct the first and second nodes includes to instruct the first and second nodes to manipulating 5-tuples of packets to be transmitted between the first and second nodes to follow the first and second round-trip routes.

* * * * *